United States Patent [19]
Franzen et al.

[11] Patent Number: 6,092,969
[45] Date of Patent: Jul. 25, 2000

[54] POSITIONING DEVICE FOR AT LEAST ONE PALLET

[75] Inventors: Hermann Franzen, Mönchengladbach; Joachim Kröll, Jüchen, both of Germany

[73] Assignee: Mannesmann AG, Düsseldorf, Germany

[21] Appl. No.: 09/275,328

[22] Filed: Mar. 24, 1999

[30] Foreign Application Priority Data

Mar. 26, 1998 [DE] Germany .............................. 198 14 635

[51] Int. Cl.[7] .................................................. B65G 67/60
[52] U.S. Cl. ................................. 414/139.9; 414/140.2; 414/140.3; 414/141.3; 414/416; 414/799
[58] Field of Search ..................................... 414/416, 799, 414/140.3, 140.2, 141.3, 139.9, 139.4

[56] References Cited

U.S. PATENT DOCUMENTS

| | | | |
|---|---|---|---|
| 3,517,831 | 6/1970 | Hahn | ................................... 414/416 X |
| 3,812,987 | 5/1974 | Watatani | .......................... 414/141.3 X |
| 4,172,685 | 10/1979 | Nabeshima et al. | . |

FOREIGN PATENT DOCUMENTS 9401357  1/1994  WIPO .

OTHER PUBLICATIONS

Article entitled "Der Vorrichtungsbau" by HeinrichMauri published in Springer–Verlag in 1965, 2 pages.

*Primary Examiner*—Steven A. Bratlie
*Attorney, Agent, or Firm*—Cohen,, Pontani, Lieberman & Pavane

[57] ABSTRACT

A positioning device for at least one pallet that is deposited on a deposit area of a raiseable and lowerable container having at least one open side, especially for unloading ships, whereby the deposit area is larger than the pallets by a predetermined amount. To permit automatic alignment of the pallets and their subsequent automatic removal by means of a horizontal conveyor, that the deposit area bordered on two opposite sides by two contact surfaces, which are arranged vertically parallel to each other and can be synchronously moved toward each other into a central position. The container is be insertable from above into a precentering opening of a centering frame, which precentering opening corresponds to the outer contour of the container cross-section, and placeable onto a horizontal support surface arranged thereunder, whereby the contact surfaces are automatically movable toward each other, up to pallet width, by deflection of the weight of the loaded container.

10 Claims, 8 Drawing Sheets

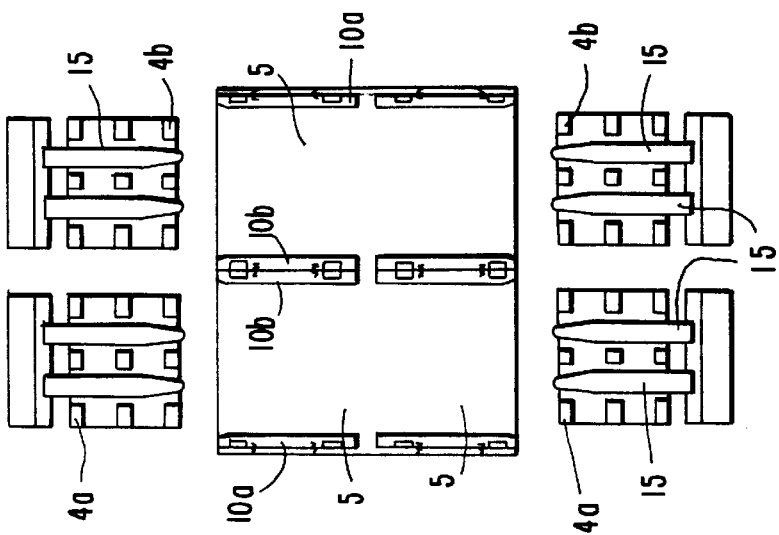
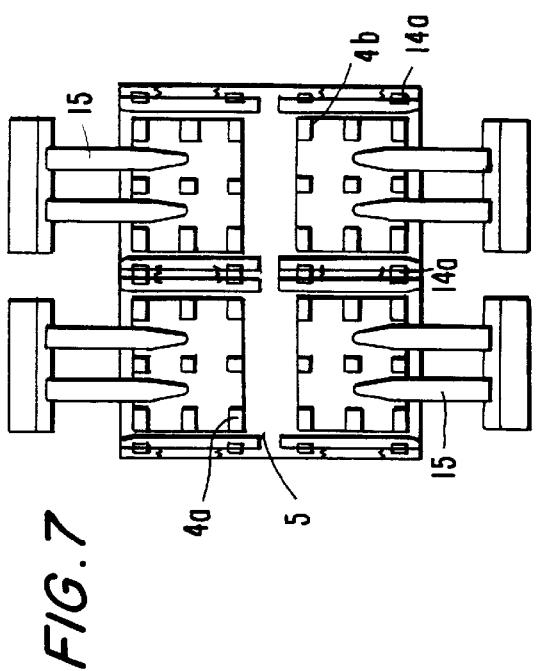
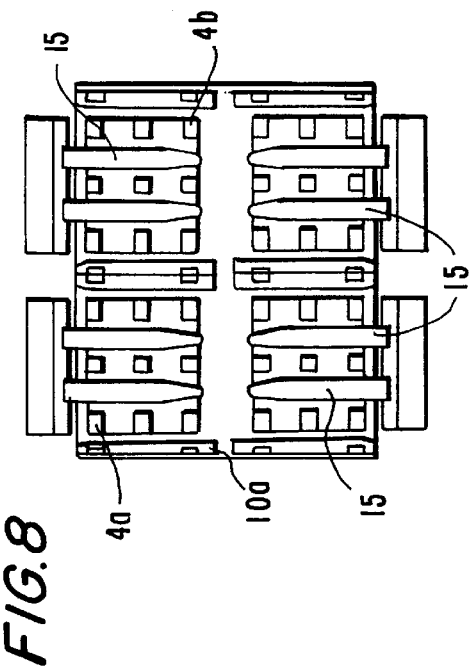

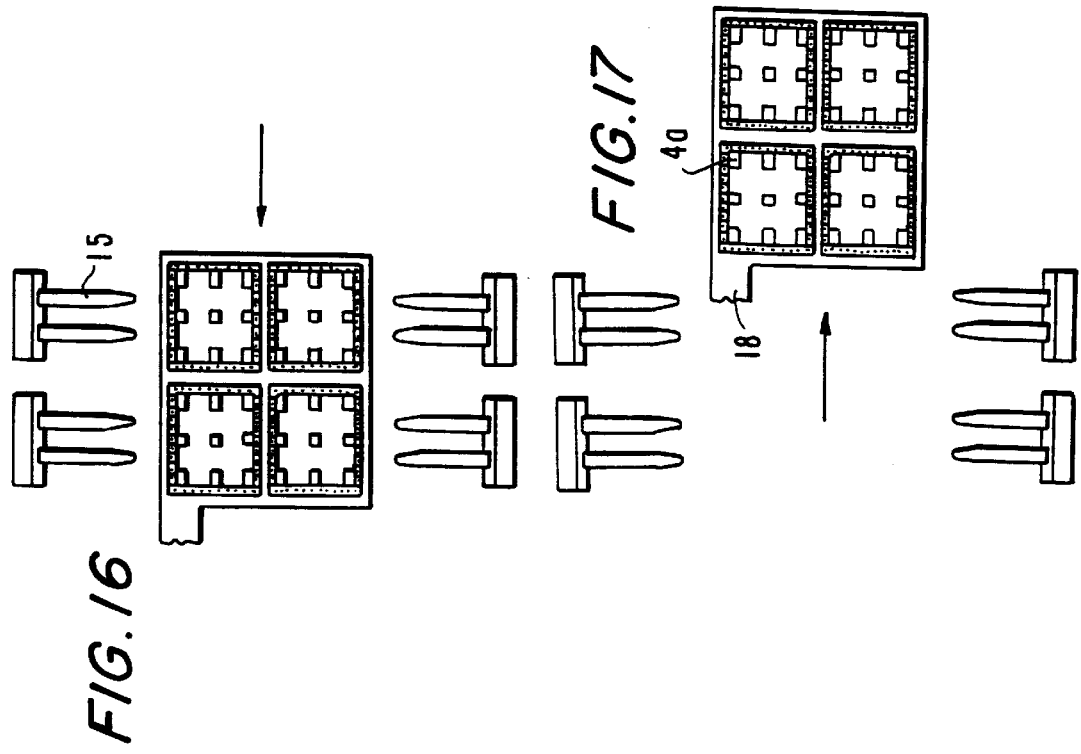
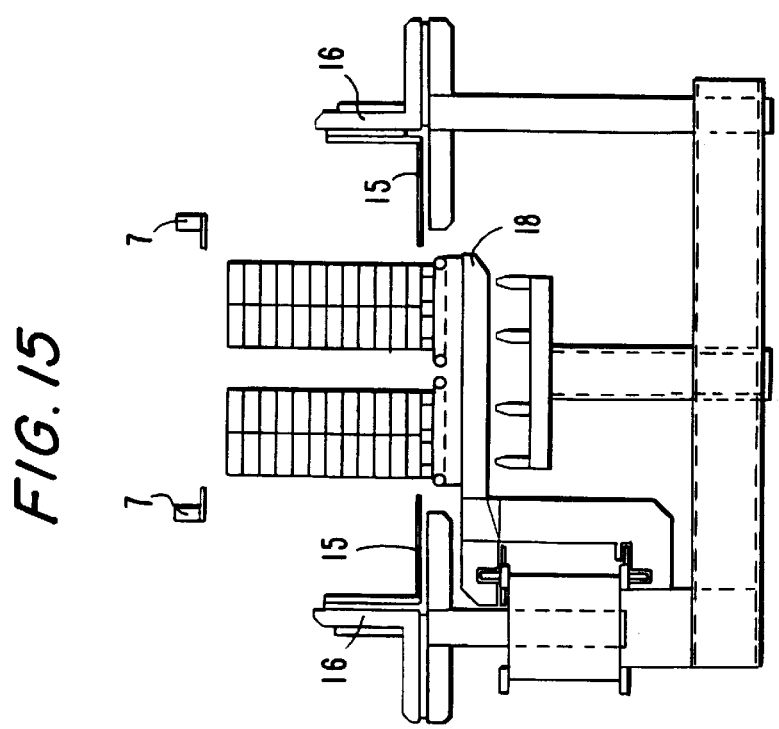

POSITIONING DEVICE FOR AT LEAST ONE PALLET

BACKGROUND OF THE INVENTION

1. Field of the Invention

The invention relates to a positioning device for at least one pallet in a deposit area of a container.

2. Discussion of the Prior Art

In unloading ships, it is known to use containers with a cage-type housing that can be raised and lowered, as well as moved on a jib by means of a trolley. At the bottom of the container is an area for depositing pallets, which can be placed into or removed from the container through an open side of the container. The container loaded with pallets is lifted from the ship and set down at another location, where the pallets are then removed.

Disadvantageously, the pallets are usually placed in the deposit area at angular and lateral offsets relative to a target position. When the pallets are to be automatically unloaded by means of a horizontal conveyor, such offsets disrupt the smooth running of the unloading process.

SUMMARY OF THE INVENTION

The object of the present invention is to provide a positioning device, as well as a conveyor device with such a positioning device, that permits the automatic alignment of pallets for the purpose of their subsequent automatic unloading by means of a horizontal conveyor.

With respect to the positioning device, according to the invention, the deposit area for the pallets is bordered on two opposite sides by two parallel vertical contact surfaces, which can be moved toward each other synchronously into a central position. The container can be inserted from above into a precentering opening in a centering frame, which precentering opening corresponds to the outer contour of the container cross-section, and can then be placed upon a horizontal support surface arranged below the precentering opening. The contact surfaces are then automatically moved toward each other, up to the pallet width, by the deflection of the weight of the loaded container. Thus, with the help of the contact surfaces, pallets placed in a predetermined area are aligned with no additional expenditure of energy, but solely by the deflection of weight, in such a way that their longitudinal and/or narrow sides run virtually parallel to the contact surfaces. Therefore, it is no longer necessary to align the pallets manually or with other means to prepare for their automatic removal.

Advantageously, the weight of the loaded container is deflected by means of upwardly directed vertical elements arranged on the support surfaces. When a container is set down, these vertical elements penetrate into openings in the container bottom and into the container itself. The vertical elements correspond to the contact surfaces in such a way that, when a container is set down, each contact surface can move toward the lateral pallet surface located opposite to it. Thus, the contact surfaces are moved by means of weight via special elements, and the pallets are aligned simply and with a movement force proportional to the pallet weight.

The positioning device has an especially simple design when each of the aforementioned vertical elements is embodied as a wedge with its tip pointing vertically upward, whose wedge-shaped side that slants outward away from the contact surface, seen from bottom to top, faces the associated contact surface. Thanks to their wedge shape, the elements penetrating into the container cause the contact surfaces to move synchronously toward the pallets.

The alignment of the pallets is improved when each deposit area is formed on a plate-like push strip.

A uniform and synchronous parallel movement of the push strips is attained by virtue of the fact that each push strip can be moved by means of two wedges that are separated from each other in the longitudinal direction. The push strips are repositionable in that each push strip can be returned to its original position by means of return springs.

Advantageously, each opening is embodied as a slot, whose longitudinal extension runs at a right angle to the contact surface.

Only limited means are required when each push strip, in its initial position, almost completely covers the openings beneath it, so that the push strip is reliably pressed to the side by the wedge, beginning with the wedge tip.

To allow the pallets to be transported by means of a horizontal conveyor, the deposit area is arranged on a vertically raiseable and lowerable frame, so that the deposit area can be moved away downward. The horizontal conveyor can then be brought into the area that has thus become free.

With respect to the conveyor device, according to the invention, the upper edge of the container is equipped with at least one holding element, via which the container is supported on the centering frame. Moreover, a lifting structure is provided outside of the container on at least one of the open sides of the container.

On the lifting structure are two horizontal forks that can be moved, parallel to the direction of the contact surfaces, into and out of pallets placed in front of the forks. By means of these forks, pallets can be lifted and moved out of the container. Further, when the pallets are moved out of the container and the container is removed, a horizontal conveyor can be brought into the region of the lowered deposit area. The pallets can then be placed on the horizontal conveyor by moving in and lowering the forks. After the forks are moved back, the pallets can be transported by the horizontal conveyor to another location.

The various features of novelty which characterized the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The drawings show:

FIG. 6 is a view as in FIG. 5 with forks moved in;

FIG. 7 is a top view as in FIG. 4 with forks partially moved in;

FIG. 8 is a top view as in FIG. 4 with forks completely moved in;

FIG. 9 is a top view as in FIG. 4 with the pallets moved out of the container and supported on the forks;

FIG. 11 shows an arrangement of pallets supported on the forks before the horizontal conveyor is brought in;

FIG. 12 is a top view as in FIG. 11 with the horizontal conveyor;

FIG. 15 is a front view as in FIG. 13 with the forks moved away;

FIG. 16 is atop view of FIG. 15; and

FIG. 17 is a top view as in FIG. 16 with the horizontal conveyor moved out of the transfer area.

DETAILED DESCRIPTION OF THE PREFERRED EMBODIMENTS

Figure 1:
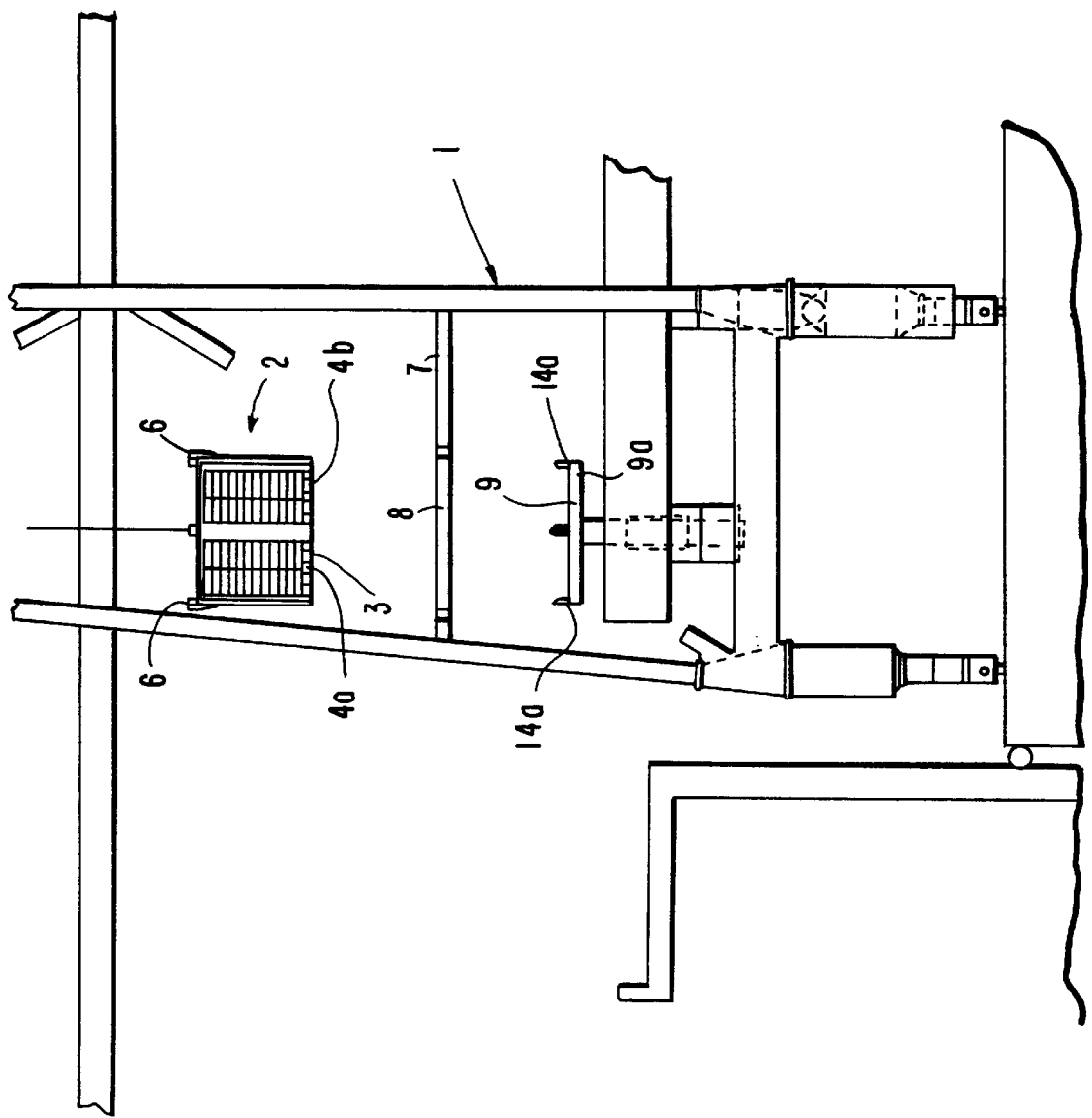
FIG. 1 is a front view of a conveyor device with positioning device pursuant to the present invention.

FIG. 1 shows a front view of a conveyor device 1 for loading a ship, wherein a raiseable and lowerable container 2 can be moved by a trolley (not shown) on the jib of a crane. The container 2 has a cage-type housing that, in FIG. 1, is accessible from the front and rear sides. Pallets 4a, 4b are deposited on a deposit area 5 (see FIG. 2) at the bottom 3 of the container 2. Holding elements 6 are arranged at the upper edge of the container 2.

FIG. 1 shows, below the container 2, a centering frame 7 with a precentering opening 8 that corresponds to the outer contour of the container cross-section. The container 2 can be inserted into the precentering opening 8 by being lowered from above. Once inserted, the container 2 rests with the holding elements 6 on the centering frame 7. At the same time, the container 2 rests on a support surface 9 located below the centering frame 7. The support surface 9 is arranged on a vertically raiseable and lowerable frame 9a.

Figure 2:
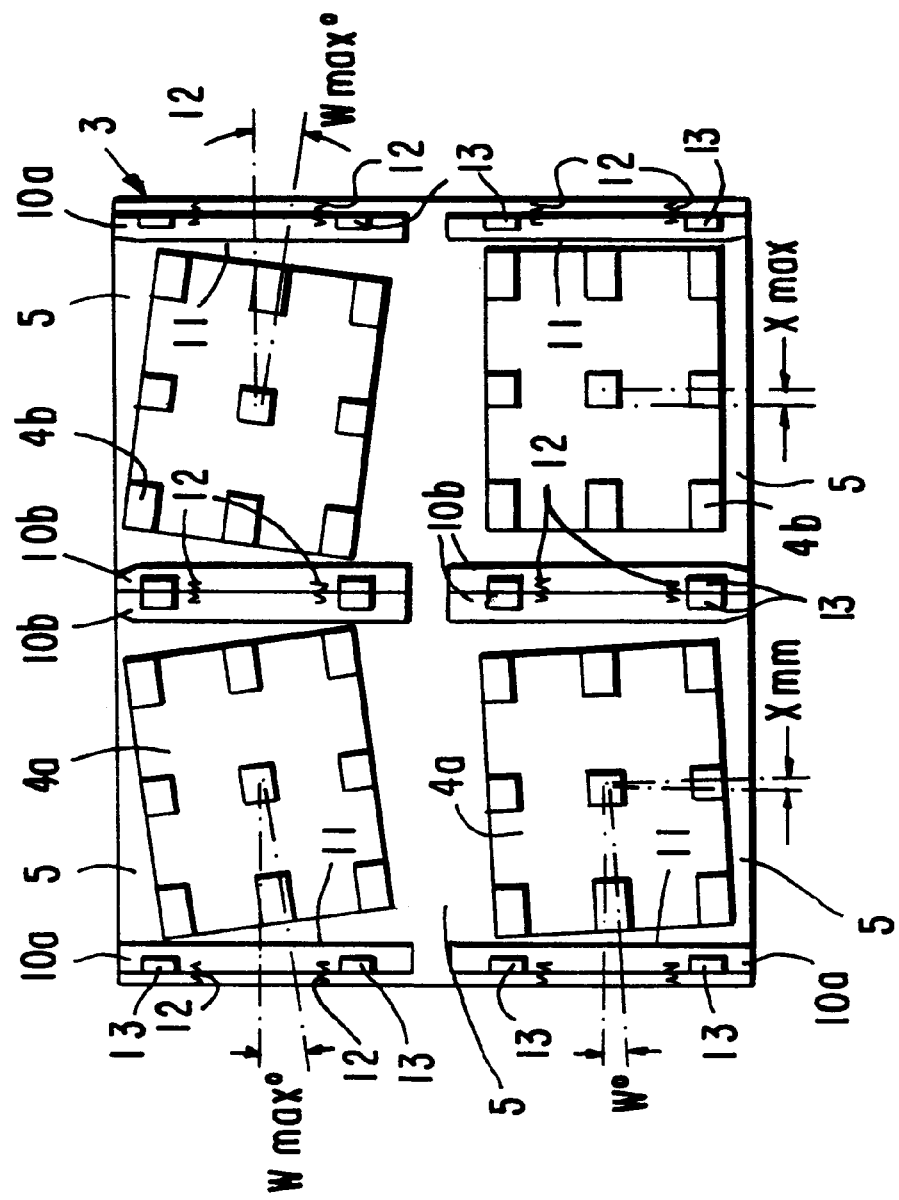
FIG. 2 is a top view of a bottom of a container with four pallets.

FIG. 2 shows a possible arrangement of four pallets 4a, 4b on the bottom 3 of the container 2, which has four deposit areas 5 for the pallets 4a, 4b. FIG. 2 clearly shows that the deposit areas 5 for the pallets 4a, 4b (which are all the same size) are larger than the pallets 4a, 4b by a predetermined amount. As a result, the individual pallets 4a, 4b cannot be turned relative to a desired target position by more than a maximum angular offset Wmax and a maximum lateral offset Xmax.

As FIG. 2 shows, plate-like push strips 10a, 10b are arranged on the container bottom 3 to the left and right of each pallet 4a, 4b.

On the side facing the pallets 4a, 4b, a vertical contact surface 11 is embodied on the push strip pairs 10a, 10b. Thus, two contact surfaces 11 that face the pallets 4a, 4b are arranged parallel to and across from each other. The push strip pairs 10a, 10b, and thus the associated contact surfaces 11, border the deposit areas 5 for the pallets 4a, 4b and are movable synchronously toward each other into a central position. The push strips 10a, 10b are held in their initial positions by means of springs 12, and each push strip 10a, 10b can also be returned to its initial position by the springs 12. FIG. 2 also shows openings 13 embodied in the container bottom 3 and separated from each other in the longitudinal direction of the strips 10a, 10b. The openings 13 are covered by the push strips 10a, 10b.

Figure 3:
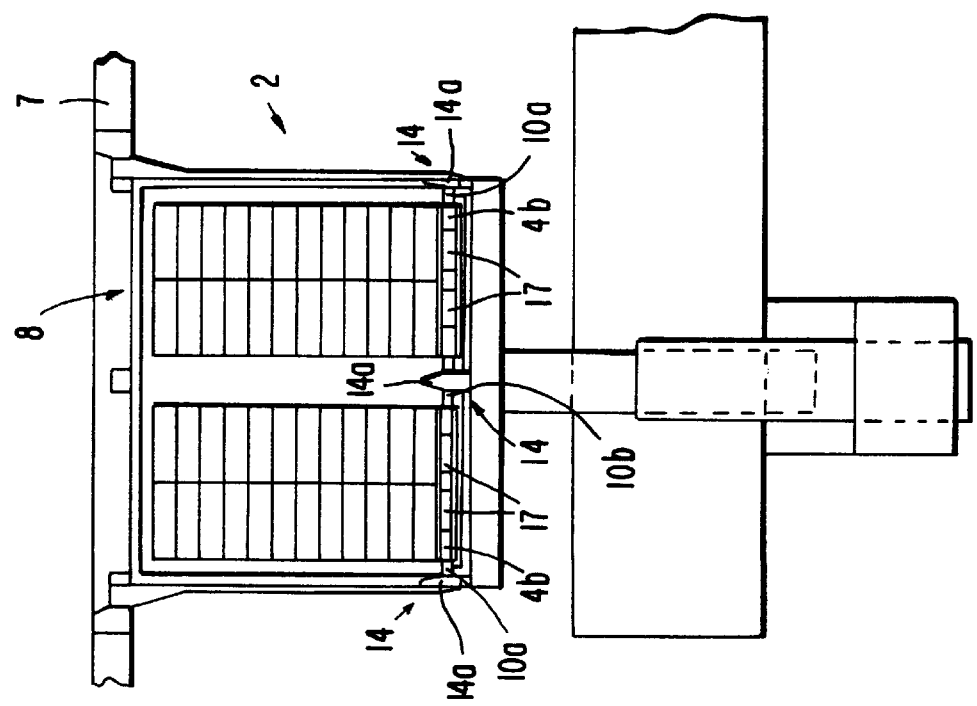
FIG. 3 is a front view of a container on support surface.
Figure 6:
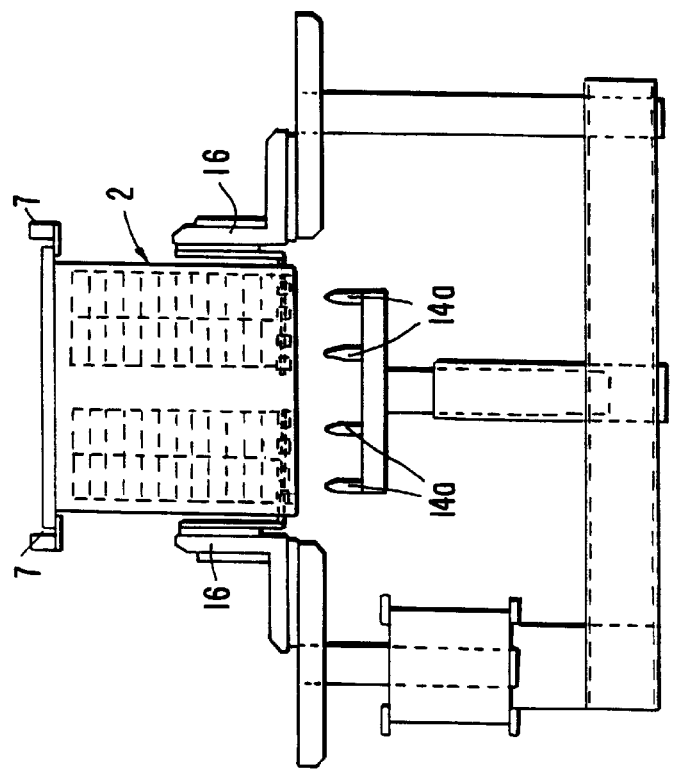
Figure 5:
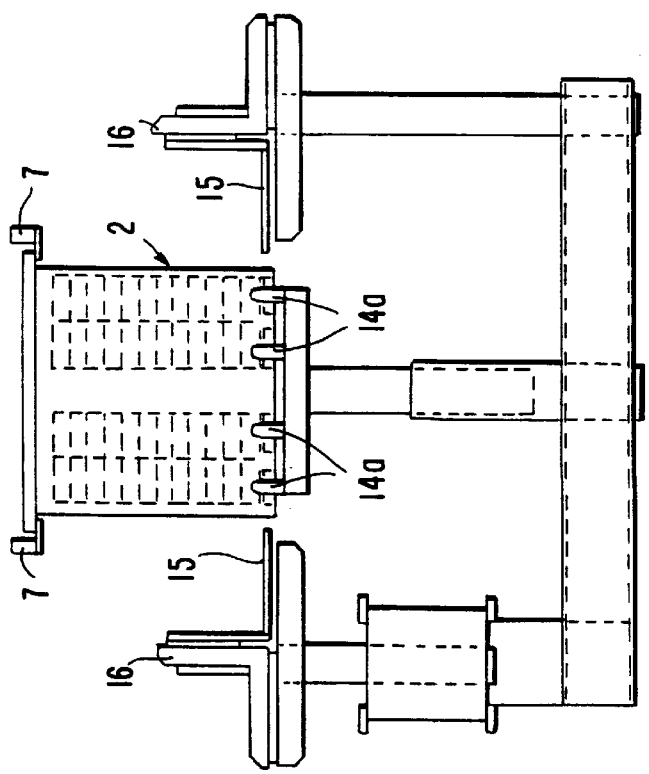
FIG. 5 is a front view as in FIG. 3 with bilateral lifting structures and forks moved out.

FIG. 3 shows a front view of the container 2 placed on the support surface 9. As FIG. 3 indicates, elements 14 directed vertically upward in the form of wedges 14a are arranged on the support surface 9. When the container 2 is set down, the wedges 14a penetrate into the openings 13 in the container bottom 3 and extend past the support surface of the deposit area 5 into the container 2. The openings 13 are embodied as slots whose longitudinal extension runs at a right angle to the contact surface 1. FIG. 3 also shows that the tips of the wedges 14a point vertically upward, and that their wedge-shaped sides face the respective contact surfaces 11, specifically, in such a way that, seen from bottom to top, the wedge-shaped side slants outward, i.e., away from the contact surface 11. The slant of the wedges 14a causes each wedge 14a that penetrates into an opening 13 to press the associated push strip 10a or 10b inward, so that, when the container 2 is set down, the contact surfaces 11 move toward the opposite lateral surface of the pallet 4a, 4b, i.e., the wedges 14a correspond to the contact surfaces 11 in this manner. The contact surfaces 11 are automatically moved toward each other, up to the pallet width, via the wedge 14a by deflection of the weight of the loaded container 2. The force proportional to weight is sufficient to reliably align the loaded pallets 4a, 4b centrally relative to the contact surfaces 11. Each push strip 10a, 10b is thus movable by means of two wedges 14a, which are separated from each other in the longitudinal direction of the strip.

Of course, the combination of wedges 14a and push strips 10a, 10b is only one possible embodiment. In another possible embodiment the wedge-shaped side itself performs the function of the contact surface 11, i.e., forms the contact surface 11.

Figure 4:
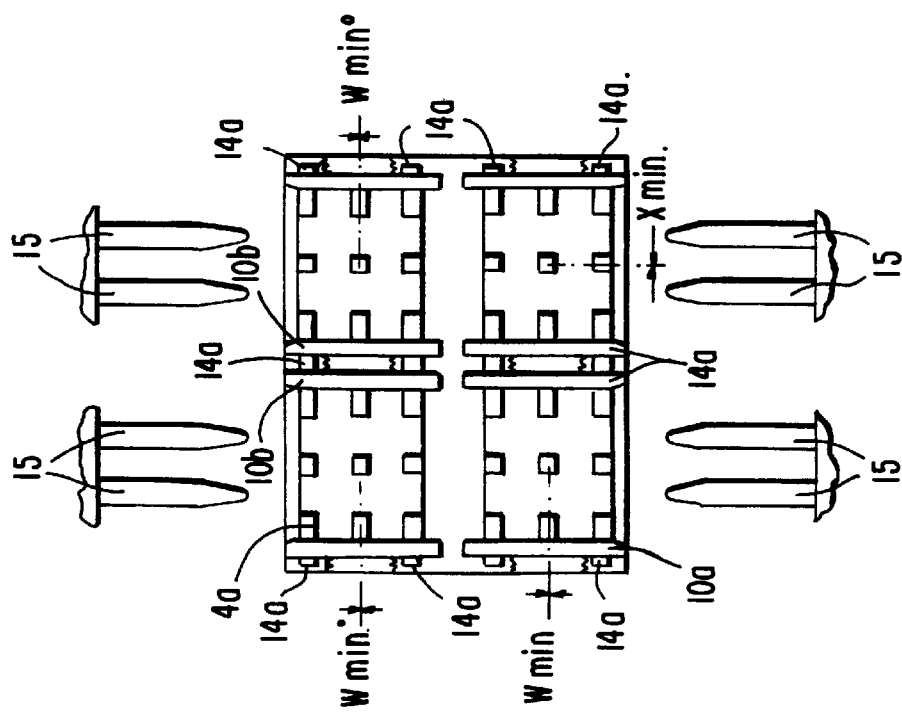
FIG. 4 is a top view of four aligned pallets with adjacent contact surfaces of push strips.

FIG. 4 shows the pallets 4a, 4b in the aligned state with the push strips 10a, 10b adjacent to two pallet sides. FIG. 4 also shows two forks 15, which are arranged next to each other and can be moved in and out. The forks 15 are positioned in pairs in front of a pallet 4a, 4b. Each of the forks 15 is attached to a lifting structure (see FIG. 10) outside of the container on its open sides. The inward travel of the forks 15 is shown in FIGS. 5–8. After the forks 15 are moved completely into receiving openings 17 in the pallets, the pallets are lifted and moved out of the container 2. This can be seen in FIG. 9.

Figure 10:
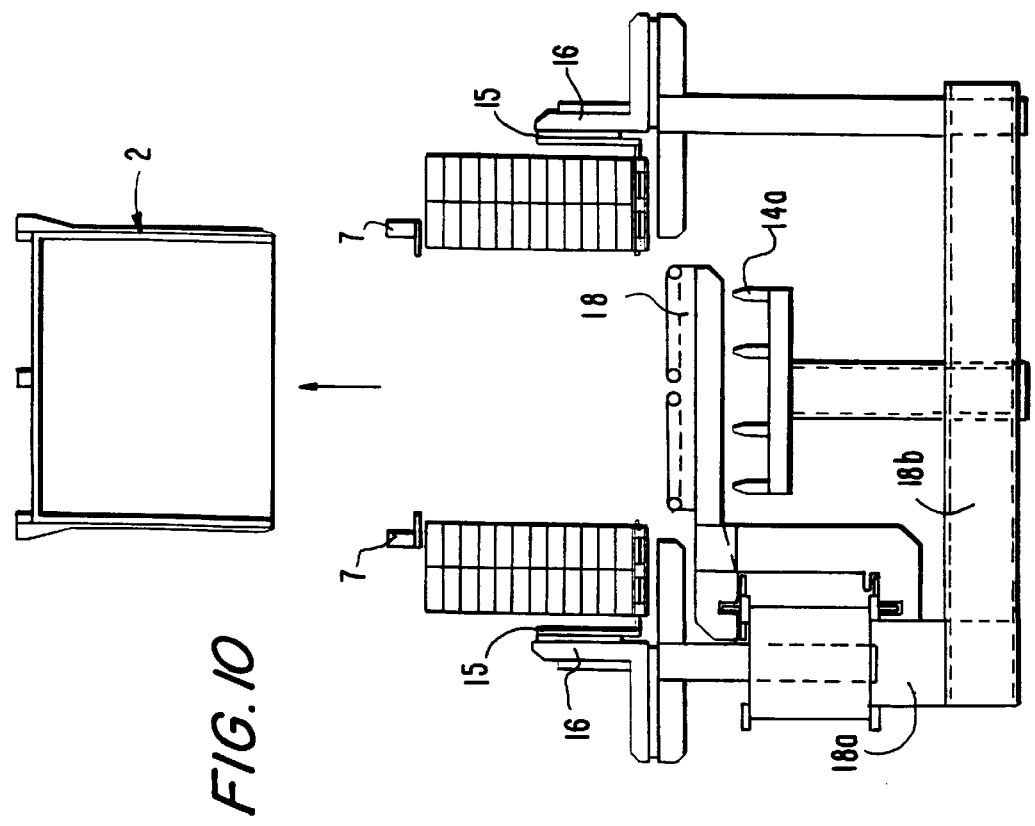
FIG. 10 is a front view of the conveyor device with the container removed and the horizontal conveyor in the ready position.

FIG. 10 shows a front view of the position depicted in FIG. 9 with a raised container 2. FIG. 10 also shows the support surface 9 in its lowered position. A horizontal conveyor 18 can be moved into the area thus made available (in FIG. 10, the horizontal conveyor 18 is already in this position). The horizontal conveyor 18 rests in a projecting manner on one of the vertical carriers 18a, which in turn is movable on a horizontal carrier 18b in the longitudinal direction of the latter.

Figures 11, 12:
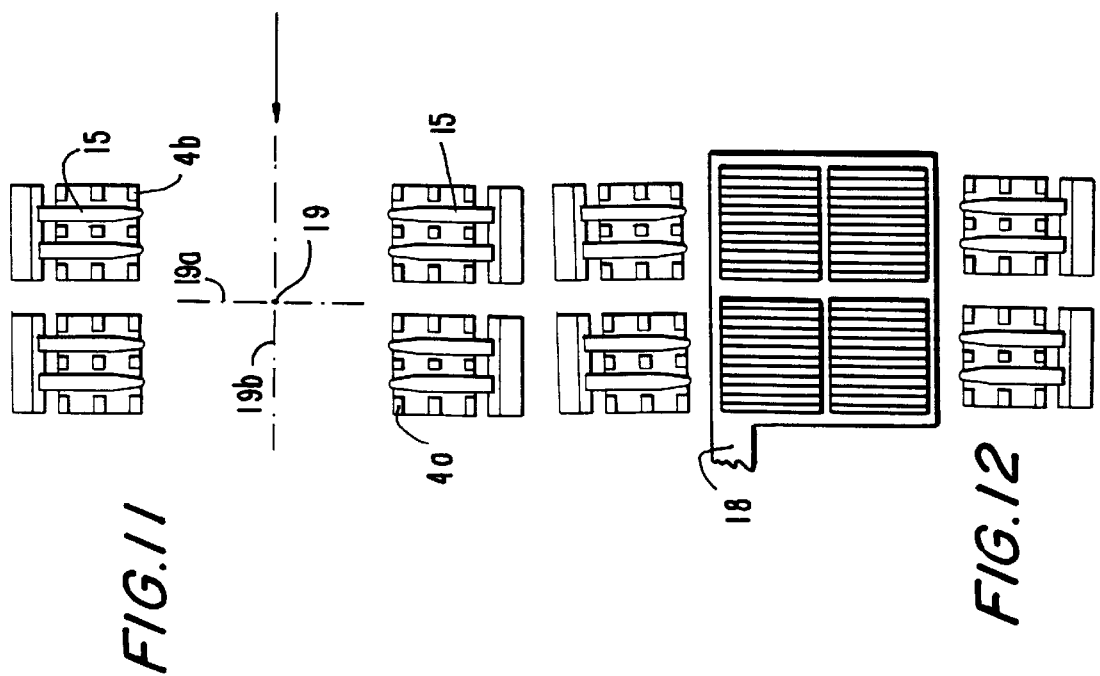
Figure 14:
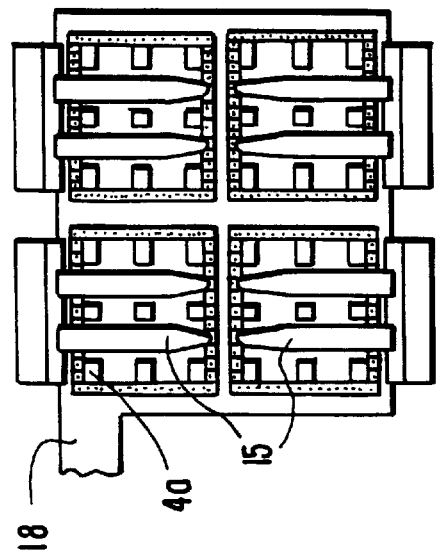
FIG. 14 is a top view of the horizontal conveyor as in FIG. 13.
Figure 13:
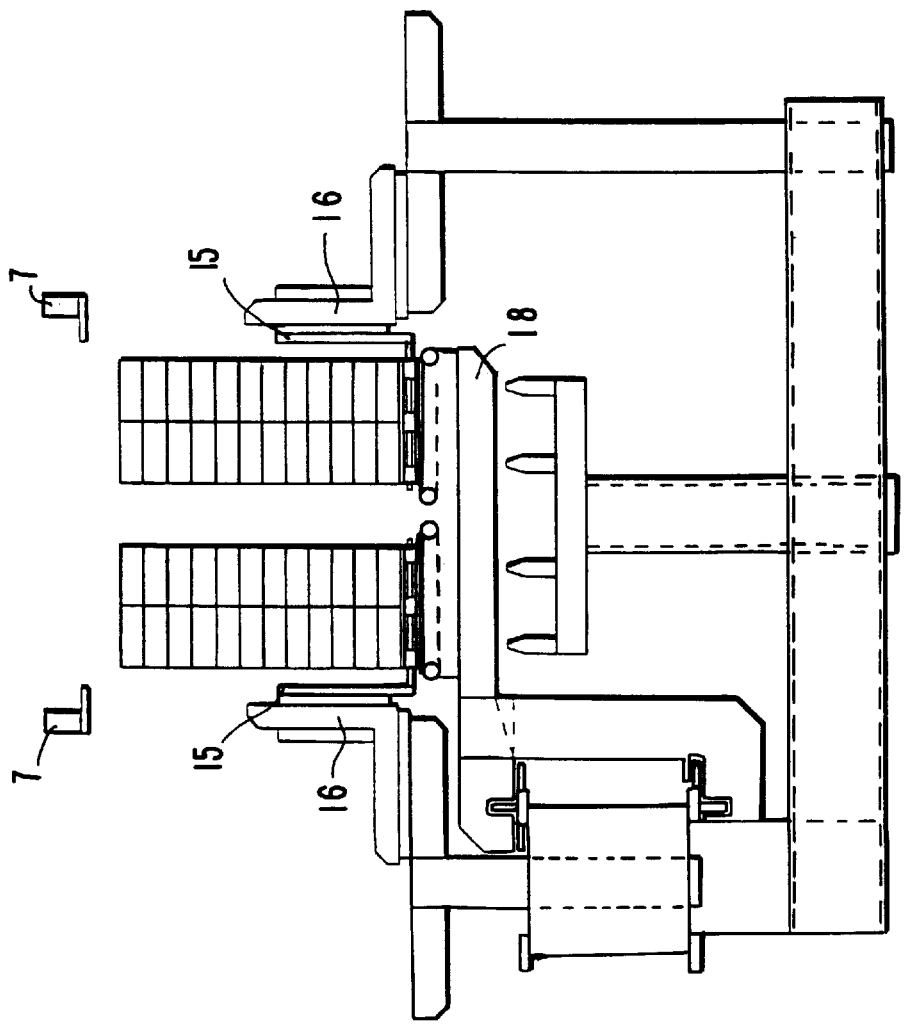
FIG. 13 is a view as in FIG. 10 with pallets placed on the horizontal conveyor.

FIG. 11 shows the position of the pallets as in FIG. 10 relative to a center 19 and two independent directions 19a, 19b. FIG. 12 shows a top view as in FIG. 10. To transfer the pallets 4a, 4b to the horizontal conveyor 18 (FIG. 13), the forks 15 are moved into the conveyor area, the pallets 4a, 4b are placed upon the horizontal conveyor 18, and the forks 15 are moved back (FIG. 15). The associated top view is shown in FIG. 14. With the forks 15 moved back, the horizontal conveyer 18 moves out of the transfer and positioning area, as shown in FIGS. 16 and 17.

The invention is not limited by the embodiments described above which are presented as examples only but can be modified in various ways within the scope of protection defined by the appended patent claims.

We claim:

1. A positioning device for positioning at least one pallet that is deposited upon a deposit area of a raiseable and lowerable container which has at least one open side, the deposit area being larger than the pallet by a predetermined amount, comprising:

two contact surfaces arranged vertically parallel to each other so as to border opposite sides of the deposit area, the contact surfaces being synchronously movable toward each other into a central position; a centering frame having a precentering opening into which the container is placeable from above, the precentering opening being configured to correspond to an outer cross-sectional contour of the container; and a horizontal support surface arranged under the centering frame, the contact surfaces being arranged to be automatically movable toward each other, up to pallet width, by deflection of weight of the container.

2. A positioning device as defined in claim 1, wherein the container has a bottom with openings, and further comprising vertically, upward directed elements arranged on the support surface so as to penetrate into the openings in the container bottom when the container is set down on the support surface and extend into the container, the elements being configured to cooperate with the contact surfaces so that each contact surface, when the container is set down, is moveable toward an opposite lateral surface of the pallet.

3. A positioning device as defined in claim 2, wherein each of the elements is configured as a wedge with a tip directed vertically upward, and a wedge-shaped side which faces the particular associated contact surface and, seen from bottom to top, slants outward away from the contact surface.

4. A positioning device as defined in claim 2, and further comprising two plate shaped push strips, each contact surface being arranged on a respective one of the plate-shaped push strips.

5. A positioning device as defined in claim 4, wherein each of the elements is configured as a wedge, each push strip being movable by two of the wedges which are separated from each other in a longitudinal direction of the strip.

6. A positioning device as defined in claim 4, and further comprising spring means for returning each push strip to its initial position.

7. A positioning device as defined in claim 2, wherein each opening is embodied as a slot having a longitudinal extension that runs at a right angle to the contact surface.

8. A positioning device as defined in claim 4, wherein each push strip is configured so that in an initial position the push strip substantially covers the opening located beneath it.

9. A positioning device as defined in claim 1, and further comprising a vertically raiseable and lowerable frame, the support surface being arranged on the vertically raiseable and lowerable frame.

10. A conveyor device for a pallet that is deposited on a deposit area of a container that is raiseable and lowerable and has at least one open side, the deposit area being larger than the pallet by a predetermined amount, comprising:

a positioning device having two contact surfaces arranged vertically parallel to each other so as to border opposite sides of the deposit area, the contact surfaces being synchronously movable toward each other into a central position, a centering frame having a precentering opening into which the container is placeable from above, the precentering opening being configured to correspond to an outer cross-sectional contour of the container, and a horizontal support surface arranged under the centering frame, the contact surfaces being arranged to be automatically movable toward each other, up to pallet width, by deflection of weight of the container;

at least one holding element arranged on an upper edge of the container so as to rest, in the inserted state, on the centering frame;

a lifting structure provided outside of the container and arranged on the open side of the container, the lifting structure having two horizontal forks which are moveable parallel to a direction of the contact surfaces into and out of receiving openings in the pallet whereby the pallets can be lifted and moved out of the container by the forks; and a horizontal conveyor moveable into a region of the deposit area with the pallets moved out of the container and the container removed, the pallets being placeable on the horizontal conveyor by moving in and lowering the forks and, after the forks are moved back, being transported by the horizontal conveyor to a different location.

* * * * *